United States Patent
Kawamura

(10) Patent No.: US 10,447,928 B2
(45) Date of Patent: Oct. 15, 2019

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Yuta Kawamura, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 177 days.

(21) Appl. No.: 15/608,427

(22) Filed: May 30, 2017

(65) Prior Publication Data

US 2017/0353661 A1    Dec. 7, 2017

(30) Foreign Application Priority Data

Jun. 30, 2016 (JP) .................. 2016-111841

(51) Int. Cl.
| | | |
|---|---|---|
| *H04N 5/232* | (2006.01) | |
| *G06K 9/62* | (2006.01) | |
| *G06K 9/00* | (2006.01) | |
| *G06T 5/00* | (2006.01) | |
| *G06T 7/20* | (2017.01) | |

(52) U.S. Cl.
CPC ..... *H04N 5/23254* (2013.01); *G06K 9/00664* (2013.01); *G06K 9/6201* (2013.01); *G06T 5/002* (2013.01); *G06T 5/003* (2013.01); *G06T 7/20* (2013.01); *H04N 5/23267* (2013.01); (Continued)

(58) Field of Classification Search
CPC .... B64D 47/00; B64D 47/08; G08B 13/1965; G08B 13/19602–19615; G03B 15/006; G03B 43/00–02; G02B 7/003–005; H04N 17/002; H04N 5/144–145; F41G 3/2605; F41G 3/2611; G06K 9/46–527; G06K 2209/21
USPC .......... 348/187, 188, 154–155, 208.7, 208.4; 396/153; 382/107
See application file for complete search history.

(56) References Cited

U.S. PATENT DOCUMENTS

| | | | | |
|---|---|---|---|---|
| 2010/0299014 A1* | 11/2010 | Bouvier | ............... | A61B 6/4405 701/25 |
| 2012/0126002 A1* | 5/2012 | Rudich | ................ | F41G 11/001 235/404 |

(Continued)

FOREIGN PATENT DOCUMENTS

JP        2008-5109 A    1/2008

*Primary Examiner* — Xi Wang
(74) *Attorney, Agent, or Firm* — Carter, DeLuca & Farrell LLP

(57) ABSTRACT

The present invention has an object to reduce occurrence of a state where a frame image with no visible subject has been generated during generation of a moving image with reduced variation in imaging trajectory. A camera trajectory estimating unit estimates an imaging trajectory during taking of a first moving image, from the first moving image. A camera trajectory correcting unit corrects a trajectory variation in the estimated imaging trajectory. An output image generating unit generates a second moving image corresponding to the corrected imaging trajectory, from the first moving image. Here, the camera trajectory correcting unit sets at least one reference point from the first moving image, and corrects the imaging trajectory so as to cause the reference point in frame images constituting the second moving image to have a position residing within a predetermined range in the frame image.

16 Claims, 13 Drawing Sheets

(52) U.S. Cl.
CPC .............. *G06T 2207/30241* (2013.01); *G06T 2207/30244* (2013.01)

(56) References Cited

U.S. PATENT DOCUMENTS

| | | | |
|---|---|---|---|
| 2012/0269444 A1* | 10/2012 | Naito | H04N 5/23229 382/197 |
| 2015/0138322 A1 | 5/2015 | Kawamura | |
| 2016/0267657 A1* | 9/2016 | Gupta | H04N 17/00 |

* cited by examiner

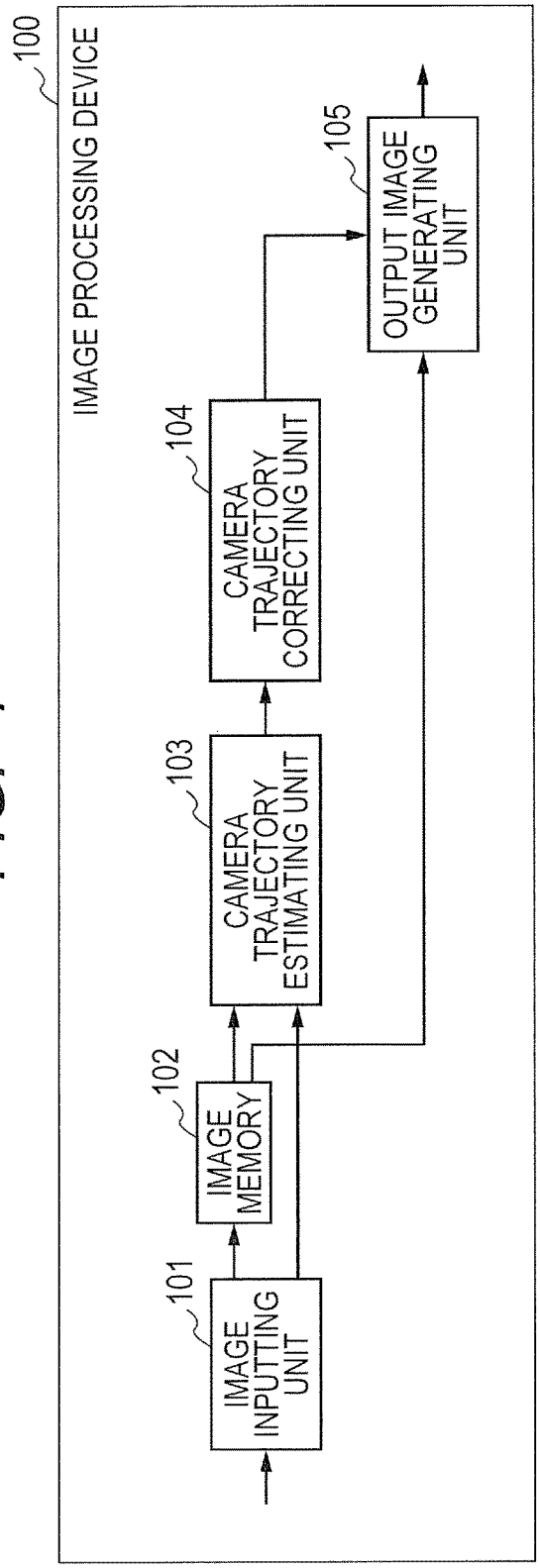
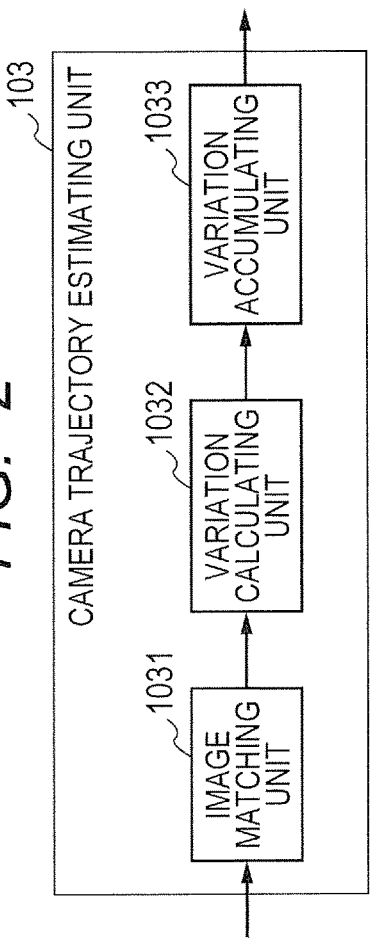

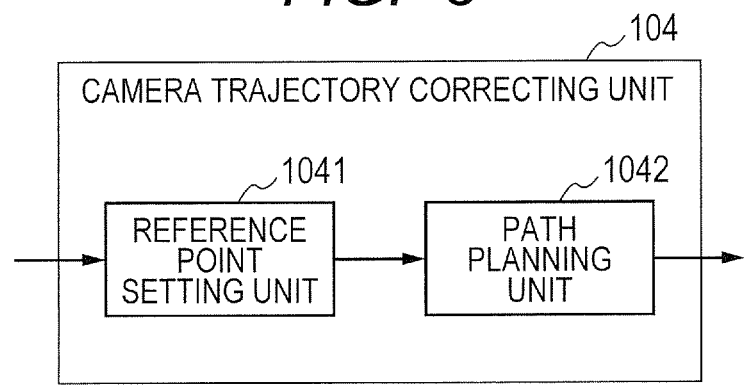
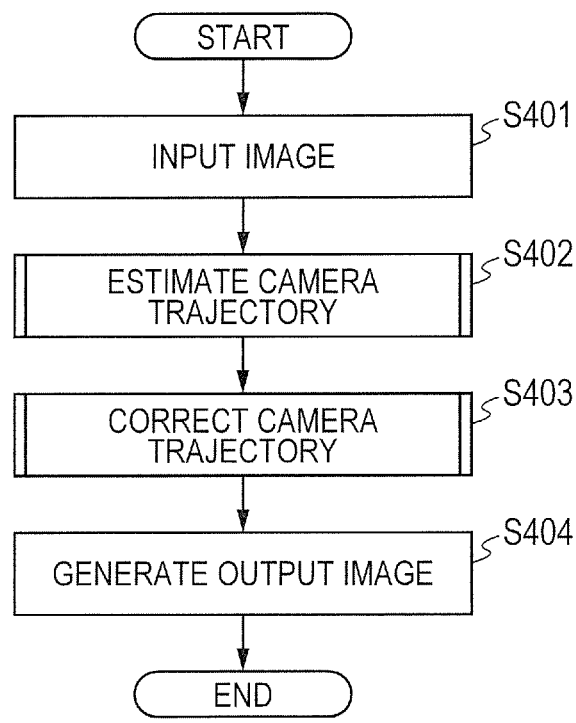

IMAGE PROCESSING APPARATUS, IMAGE PROCESSING METHOD, AND PROGRAM

BACKGROUND OF THE INVENTION

Field of the Invention

The present invention relates to an image processing apparatus, an image processing method and a program that process a taken image.

Description of the Related Art

Conventionally, as a technique of electrically stabilizing variation in a taken moving image due to a camera shake, a technique has been proposed that estimates an imaging trajectory from a taken moving image, corrects the image so as to reduce the trajectory variation of the estimated imaging trajectory, and generates a moving image corresponding to the corrected imaging trajectory. An image generated according to the corrected imaging trajectory is hereinafter represented as a "stabilized moving image". For example, Japanese Patent Application Laid-Open No. 2008-5109 discloses a technique that approximates the imaging trajectory to broken lines and adjusts the slopes of the broken lines according to imaging information.

Typically, the reproduction speed of a stabilized moving image is the same as the reproduction speed of a taken moving image. However, a taken long-time moving image is actively enjoyed as a short-time digest moving image by generating an N-time speed (N is an integer) stabilized moving image with respect to the reproduction speed of the taken moving image. Hereinafter, the stabilized moving image having an N-time speed with respect to the reproduction speed of the taken moving image is represented as "N-time speed stabilized moving image".

SUMMARY OF THE INVENTION

Unfortunately, according to the conventional technique disclosed in Japanese Patent Application Laid-Open No. 2008-5109 described above, a subject is visible in the taken moving image but, for example, only the sky and ground are visible in the stabilized moving image corresponding to the corrected imaging trajectory where a frame with no subject being visible sometimes occurs. It is believed that such an event occurs because the imaging trajectory is corrected with high priority to reduction in variation in imaging trajectory, and an image region is cut out from the frame image of the taken moving image based on the corrected imaging trajectory to form the frame image of a stabilized moving image.

The present invention has an object to make generation of a moving image with reduced variation in imaging trajectory be resistant to coming into a state where a frame image with no visible subject is generated.

According to an aspect of the present invention, an image processing apparatus, comprises: a trajectory estimation unit that estimates an imaging trajectory during taking of a first moving image, from the first moving image; a trajectory correcting unit that corrects a trajectory variation in the estimated imaging trajectory; a generating unit that generates a second moving image corresponding to the corrected imaging trajectory, from the first moving image; and a setting unit that sets at least one reference point from the first moving image, wherein the trajectory correcting unit corrects the imaging trajectory so as to cause the reference point in frame images constituting the second moving image to have a position residing within a predetermined range in the frame image.

The present invention allows generation of a moving image with reduced variation in imaging trajectory to be resistant to coming into a state where a frame image with no visible subject has been generated.

Further features of the present invention will become apparent from the following description of exemplary embodiments with reference to the attached drawings.

BRIEF DESCRIPTION OF THE DRAWINGS

FIG. 1 is a diagram illustrating a schematic configuration of an image processing apparatus of an embodiment.

FIG. 2 is a diagram illustrating a schematic configuration of camera trajectory estimating unit.

FIG. 3 is a diagram illustrating a schematic configuration of a first camera trajectory correcting unit.

FIG. 4 is a flowchart illustrating the entire operation of the image processing apparatus.

DESCRIPTION OF THE EMBODIMENTS

Figure 5A:
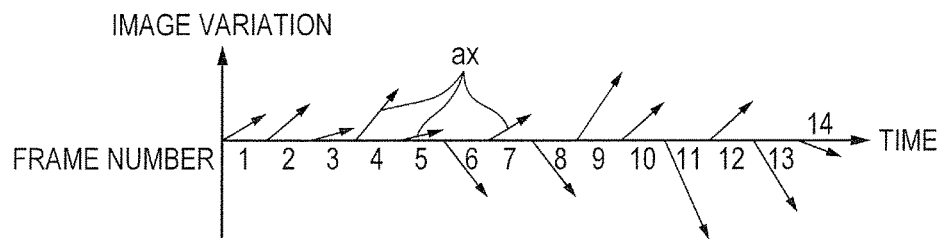
FIGS. 5A, 5B and 5C are diagrams illustrating operations of a camera trajectory estimating unit and a camera trajectory correcting unit.

Preferred embodiments of the present invention will now be described in detail in accordance with the accompanying drawings.

First Embodiment

FIG. 1 is a diagram illustrating a schematic configuration of an image processing apparatus 100 of a first embodiment. An image processing apparatus 100 of this embodiment has a function that estimates an imaging trajectory from a taken moving image, corrects the image so as to reduce the trajectory variation of the estimated imaging trajectory due to a camera shake, and generates a stabilized moving image corresponding to the corrected imaging trajectory. Furthermore, the image processing apparatus 100 of this embodiment has a function of making generation of a stabilized moving image with reduced variation in imaging trajectory be resistant to coming into a state where a frame image with no visible subject has been generated.

The image processing apparatus 100 of this embodiment illustrated in FIG. 1 includes an image inputting unit 101, an image memory 102, a camera trajectory estimating unit 103, a camera trajectory correcting unit 104, and an output image generating unit 105.

Into the image inputting unit 101, a data on a moving image and a still image is input. The image inputting unit 101 may be one of an imaging apparatus (camera) that takes a moving image, and an input interface through which a taken moving image taken by an external imaging apparatus is supplied. In this embodiment, description is made with reference to a case where a taken moving image is input by the image inputting unit 101. The image memory 102 temporarily stores image data of one or more frames of a taken moving image input by the image inputting unit 101.

The camera trajectory estimating unit 103 uses the image input from the image inputting unit 101 and the image stored in the image memory 102 to estimate a camera trajectory, which is an imaging trajectory in a case where a moving image is taken. The camera trajectory correcting unit 104 corrects the image so as to reduce variation in camera trajectory estimated by the camera trajectory estimating unit 103, thereby generating a stabilized camera trajectory. The details of the configuration and operation of the camera trajectory estimating unit 103 and the camera trajectory correcting unit 104 are described later.

The output image generating unit 105 generates the stabilized moving image by a rendering process that reads the image region according to the camera trajectory stabilized by the correction in the camera trajectory correcting unit 104, from the taken moving image stored in the image memory 102, and reconstructs a moving image. The correction of variation in camera trajectory and the reconstruction of the moving image according to the camera trajectory after this correction of variation enable an N-time speed stabilized moving image to be generated; the N-time speed stabilized moving image has the speed of N times the reproduction speed of the taken moving image, that is, the N-time speed stabilized moving image spanning a shorter time than the taken moving image. For example, the N-time speed stabilized moving image is generated by a publicly known method of thinning out the frame image at every predetermined time interval from each of frame images constituting the taken moving image when the moving image is reconstructed according to the camera trajectory after correction of variation. The details of the configuration and operation of the output image generating unit 105 are described later.

FIG. 2 is a diagram illustrating the schematic configuration of the camera trajectory estimating unit 103 of the image processing apparatus 100 in FIG. 1. The camera trajectory estimating unit 103 includes an image matching unit 1031, a variation calculating unit 1032, and a variation accumulating unit 1033.

The image matching unit 1031 performs a process of matching the current frame image (frame number n) and the next frame image (frame number n+1) of the taken moving image against each other. Here, the frame image read from the image memory 102 and the frame image supplied from the image inputting unit 101 are input into the image matching unit 1031. In this embodiment, the frame image read from the image memory 102 is an image one frame before the frame image input from the image inputting unit 101. Consequently, when the frame image read from the image memory 102 is the current frame image having the frame number n, the frame image input from the image inputting unit 101 is the next frame image having the frame number n+1. The details of the matching process are described later.

The variation calculating unit 1032 calculates the inter-image variation between the current frame image and the next frame image, based on the result of the matching process by the image matching unit 1031. The details of the variation calculating process are described later. The variation accumulating unit 1033 calculates the camera trajectory by accumulating the inter-image variation calculated by the variation calculating unit 1032. The details of the camera trajectory calculating process are described later.

FIG. 3 is a diagram illustrating a schematic configuration of the camera trajectory correcting unit 104 of the image processing apparatus 100 in FIG. 1. The camera trajectory correcting unit 104 includes a reference point setting unit 1041 and a path planning unit 1042.

The reference point setting unit 1041 sets the reference point on the first frame image (the frame number is zero) of the taken moving image. The details of the reference point setting process are described later. The path planning unit 1042 corrects the camera trajectory estimated by the camera trajectory estimating unit 103, based on the reference point set by the reference point setting unit 1041. The details of the camera trajectory correcting process are described later.

FIG. 4 is a flowchart illustrating the flow of processes in the image processing apparatus 100 in this embodiment. The processes illustrated in the flowchart of FIG. 4 may be realized by a hardware configuration. Alternatively the processes may be realized by a CPU executing an image processing program according to this embodiment. The image processing program may be preliminarily prepared in ROM, read from a recording medium, such as HDD, or downloaded via a network, such as the Internet, and loaded on RAM. In the following description, steps S401 to steps S404 of the processes in the flowchart are abbreviated as S401 to S404. The representation is analogous also to each of the following flowcharts.

For example, the process of the flowchart in FIG. 4 is started by a user instructing the image processing apparatus 100 in generating a stabilized moving image (including the N-time speed stabilized moving image). After start of the processes of the flowchart of FIG. 4, first, in S401, a data on the taken moving image is input by the image inputting unit 101. The data on the taken moving image input by the image inputting unit 101 is temporarily stored in the image memory 102. After S401, the processing of the image processing apparatus 100 advances to the process in S402 to be performed by the camera trajectory estimating unit 103.

In S402, the camera trajectory estimating unit 103 performs camera trajectory estimating, using the image input in S401 and the image stored in the image memory 102. More specifically, the camera trajectory estimating unit 103 performs the process of matching the current frame image (frame number n) and the next frame image (frame number n+1), which are adjacent to each other on the temporal axis, against each other to obtain the amount of movement between the images, and detects the image variation between these images.

Figure 5B:
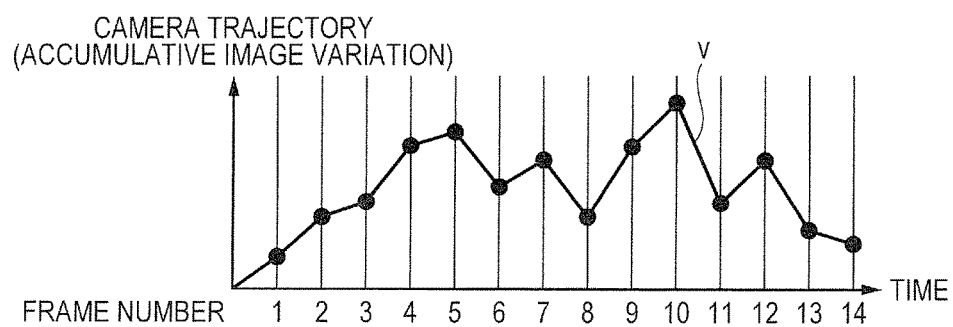

FIG. 5A is a diagram where the image variation ax detected by the camera trajectory estimating unit 103 on a frame-by-frame basis is arranged in a time series manner according to the frame number, and the ordinate axis indicates the image variation and the abscissa axis indicates the frame number (in actuality, the imaging time of the frame image). The image variation ax in each frame in FIG. 5A is represented by a single arrow. The single arrow has components in three directions, or x-axis, y-axis and z-axis directions in the three-dimensional space. The camera trajectory estimating unit 103 accumulates the image variation ax in each frame illustrated in FIG. 5A in the temporal direction to obtain an accumulative image variation as illustrated in FIG. 5B. The accumulative image variation corresponds to the camera trajectory v at the time when each frame image is taken. The camera trajectory estimating unit 103 outputs information on the accumulative image variation (input camera trajectory v) to the camera trajectory correcting unit 104. After S402, the processing of the image processing apparatus 100 advances to the process in S403 to be performed by the camera trajectory correcting unit 104.

Figure 5C:
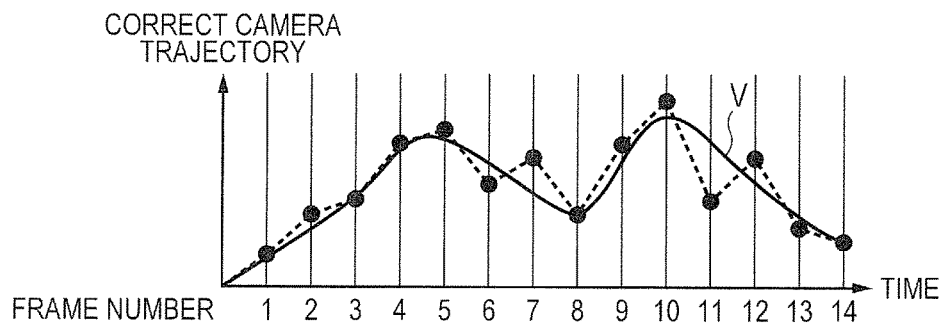

In S403, the camera trajectory correcting unit 104 corrects the variation in camera trajectory estimated in S402. More specifically, the camera trajectory correcting unit 104 applies a stabilizing filter process to the input camera trajectory v illustrated in FIG. 5B so as to smooth the variation on a frame-by-frame basis, and generate a corrected camera trajectory V as illustrated in FIG. 5C. Information on the corrected camera trajectory V generated by the camera trajectory correcting unit 104 is transmitted to the output image generating unit 105. After S403, the processing of the image processing apparatus 100 advances to the process in S404 to be performed by the output image generating unit 105.

In S404, the output image generating unit 105 generates the stabilized moving image, based on the camera trajectory corrected in step S403. More specifically, the output image generating unit 105 reads the image in an angle-of-field region corresponding to the corrected camera trajectory V in FIG. 5C for each frame of the input moving image, from the frame image, and performs the rendering process that adopts the read image as the frame image of the stabilized moving image.

Figure 6A:
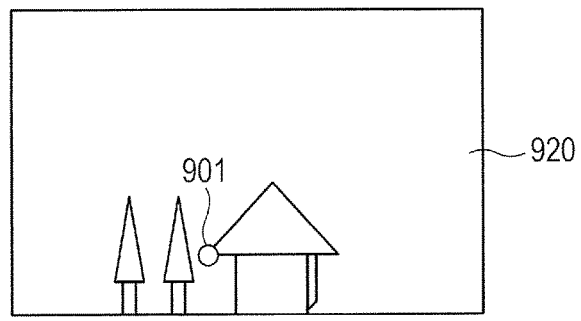
FIGS. 6A, 6B, 6C and 6D are diagrams illustrating a reference point and a central point during camera trajectory correcting.
Figure 6B:
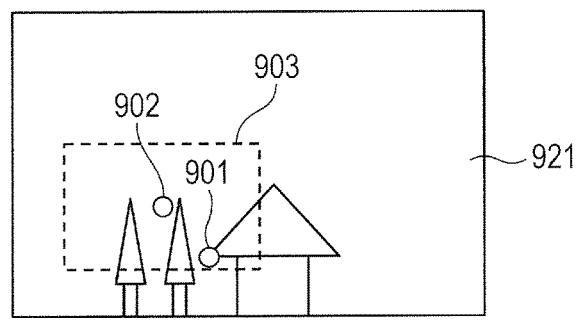
Figure 6C:
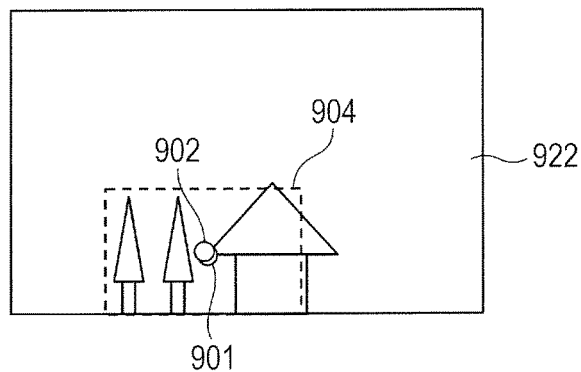
Figure 6D:
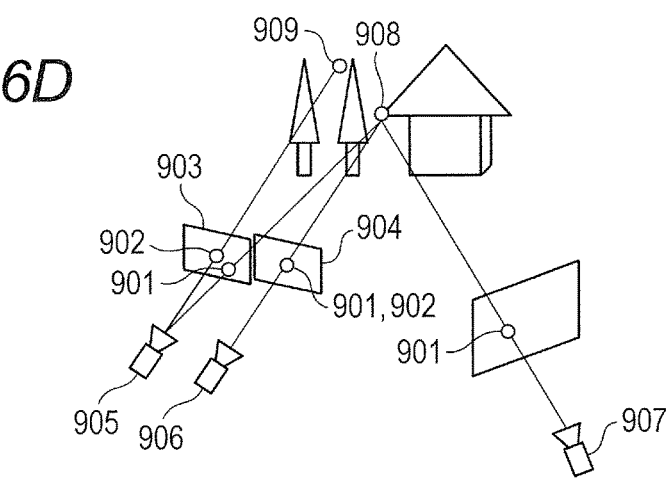

FIGS. 6A to 6D are diagrams used to illustrate situations where the output image generating unit 105 generates the stabilized moving image. In FIG. 6D, an input camera position and attitude 907 represents a camera position and attitude estimated from the camera trajectory in a case where the moving image is taken. A corrected camera position and attitude 906 represents a camera position and attitude estimated from the corrected camera trajectory. An image 920 in FIG. 6A is an example of an input frame image of a taken moving image. An image 922 in FIG. 6C is an example of a modified frame image obtained by modifying the input frame image 920 in FIG. 6A in conformity with the corrected camera position and attitude 906.

First, the output image generating unit 105 modifies the input frame image 920 in FIG. 6A according to the corrected camera position and attitude 906 to create the modified frame image 922 in FIG. 6C. More specifically, the output image generating unit 105 calculates the rotational transformation matrix and the translation vector between two camera positions and attitudes, which are the input camera position and attitude 907 and the corrected camera position and attitude 906. Furthermore, the output image generating unit 105 performs a rotation process and a translation process to the input frame image 920 in FIG. 6A, based on the rotational transformation matrix and the translation vector, thereby creating the modified frame image 922 in FIG. 6C.

Next, the output image generating unit 105 extracts an output image 904 such that this unit cuts out the angle-of-field region according to the corrected camera position and attitude 906 from the modified frame image 922 in FIG. 6C. Thus, the output image 904 cut out from the modified frame image 922 according to the corrected camera position and attitude 906 is an image corresponding to the corrected camera trajectory. The points in FIGS. 6A to 6D having not been described yet are described later.

The image processing apparatus 100 continues the processing of the flowchart of FIG. 4 until generation of the stabilized moving image from the taken image is completed or a finishing instruction is input from the user, for example. When the generation of the stabilized moving image is completed or the finishing instruction is input from the user, the image processing apparatus 100 finishes the processing of the flowchart of FIG. 4.

Figure 7:
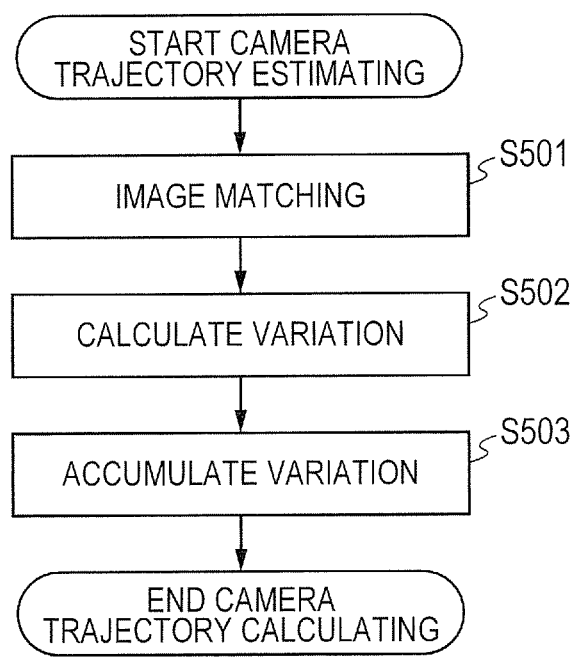
FIG. 7 is a flowchart illustrating an operation of the camera trajectory estimating unit.

FIG. 7 is a flowchart illustrating the flow of the detailed processing of a camera trajectory estimating process performed in S402 in FIG. 4 by the camera trajectory estimating unit 103 in FIG. 2.

Figure 8A:
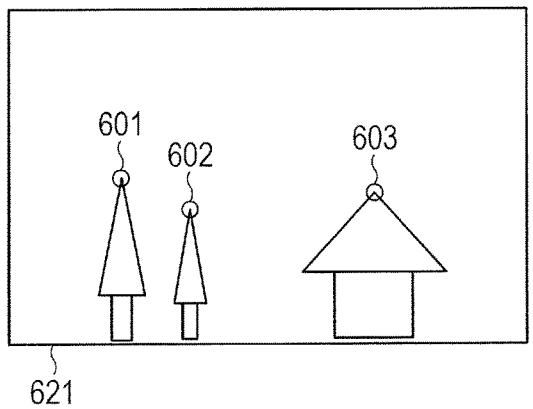
FIGS. 8A, 8B, 8C and 8D are diagrams illustrating variation calculation.
Figure 8B:
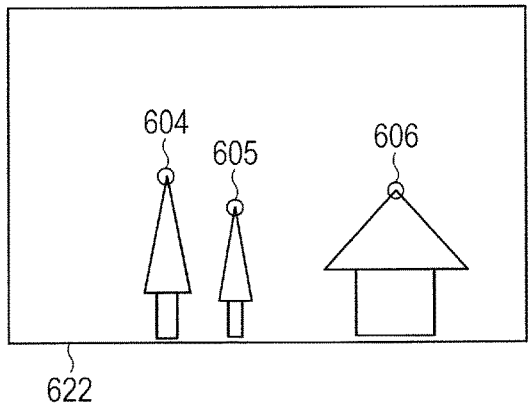
Figure 8C:
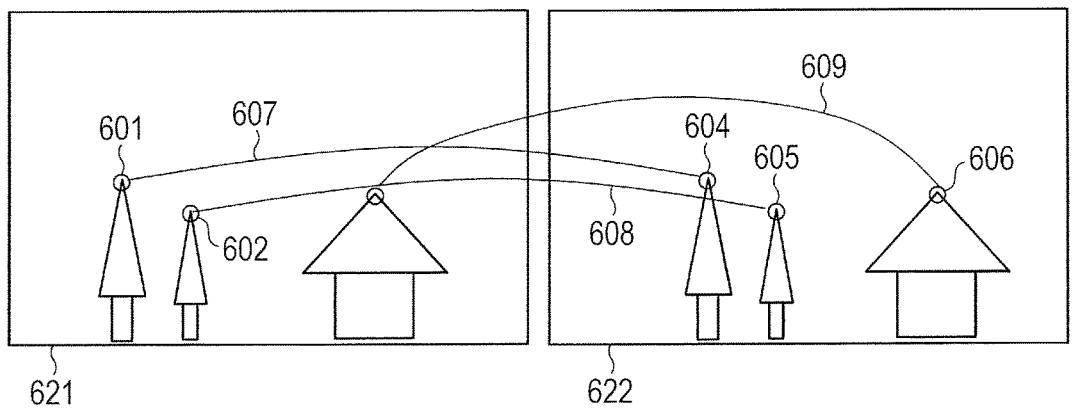

In S501 in FIG. 7, the image matching unit 1031 of the camera trajectory estimating unit 103 performs a process of matching the current frame image (frame number n) and the next frame image (frame number n+1) of the taken moving image against each other. FIG. 8A is a diagram illustrating an example of the current frame image 621 (frame number n). FIG. 8B is a diagram illustrating an example of a next frame image 622 (frame number n+1). FIG. 8C is a diagram illustrating a result of a matching process. The matching process is performed using one of an SIFT (Scale-Invariant Feature Transform) method and a KLT (Kanade-Lucas-Tomasi) method, for example. The SIFT method calculates the characteristic points of the current frame image and the next frame image, and performs correspondence search using the calculated characteristic points. The KLT method calculates the characteristic point in the current frame image, and performs characteristic point tracking that tracks the calculated characteristic point in the subsequent frame image. The method of the matching process is not limited to the SIFT method or the KLT method. Alternatively, any method may be adopted only if the method can perform the matching process.

Positions 601, 602 and 603 indicated by circles in FIG. 8A represent the respective positions of characteristic points in the current frame image 621. Positions 604, 605 and 606 indicated by circles in FIG. 8B represent the respective positions of the characteristic points in the next frame image 622. FIG. 8C illustrates lines 607, 608 and 609 between corresponding characteristic points among the characteristic points at the positions 601 to 603 in the current frame image 621 in FIG. 8A and the characteristic points at the positions 604 to 606 in the next frame image 622 in FIG. 8B. For example, the line 607 represents that the characteristic point at the position 601 in the current frame image 621 and the characteristic point at the position 604 in the next frame image 622 are adopted as the corresponding characteristic points (hereinafter represented as corresponding points). The image matching unit 1031 calculates the points (corresponding points) where the characteristic points in the current frame image 621 and the next frame image 622 correspond to each other; these points are indicated by the line 607, 608 and 609 in FIG. 8C, as results of the matching process.

FIGS. 8A to 8C illustrate the example where the number of combinations of corresponding points between the current frame image 621 and the next frame image 622 is only three.

The number of combinations of corresponding points is not limited to this example. Although the details are described later, the number of parameters of a fundamental matrix F calculated as described later is eight in this embodiment. Consequently, the number of combinations of corresponding points may be eight or more. In a case where the number of combinations of corresponding points is eight or more, the parameters of the fundamental matrix F can be accurately calculated.

For example, in a case of many corresponding points, use only of the corresponding points of the characteristic points having a high characteristic amount and matching accuracy among these corresponding points can improve the accuracy of calculating the camera position and attitude, which is to be performed later. The process of selecting the corresponding points having a high characteristic amount and matching accuracy among many corresponding points may be, for example, a process of selecting the corresponding points of characteristic points having correlation values obtained during the matching process and characteristic amounts higher than a predetermined threshold. After S501, the processing of the camera trajectory estimating unit 103 advances to the process in S502 to be performed by the variation calculating unit 1032.

Figure 8D:
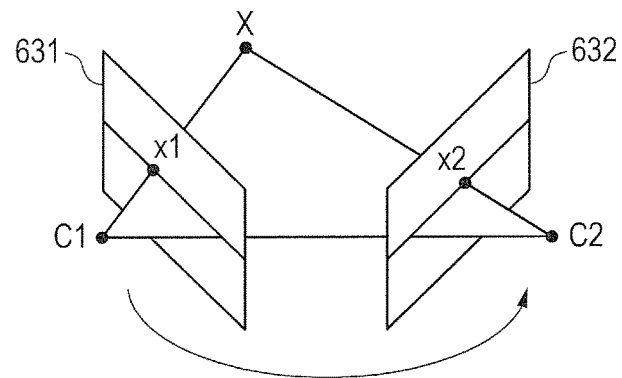

In S502, the variation calculating unit 1032 calculates the inter-image variation between the current frame image and the next frame image, based on the result of the matching process obtained in S501. FIG. 8D is a diagram used to illustrate a method of estimating the camera position and attitude using what is called Structure from Motion. The characteristic points (corresponding points) corresponding to each other between the two frame images during the matching process described above are believed to be the three-dimensionally identical point from two view points. In a case where the two view points are represented as camera centers C1 and C2 as illustrated in FIG. 8D, the identical point is represented as a three-dimensional coordinate point X. The three-dimensional coordinate point X viewed from the camera center C1 is a point x1 in a case of projection onto a frame 631 corresponding to the camera center C1. Likewise, the three-dimensional coordinate point X viewed from the camera center C2 is a point x2 in a case of projection onto a frame 632 corresponding to the camera center C2.

It is herein assumed that an inner parameter matrix corresponding to the camera center C1 is $P_1$ and an inner parameter matrix corresponding to the camera center C2 is $P_2$. The inner parameter matrix $P_1$ is represented by Expression (1). The inner parameter matrix $P_2$ is represented by Expression (2), described below.

$$P_1 = K[I|0] \qquad \text{Expression (1)}$$

$$P_2 = K[R|T] \qquad \text{Expression (2)}$$

In Expressions (1) and (2), the coordinate axes with reference to the origin are aligned to the camera center C1, I is a unit matrix, K is an internal calibration matrix, R is a rotational transformation matrix that represents the direction of the camera at the position of the camera center C2, and T is a three-dimensional translation vector. In this embodiment, as the camera of the camera centers C1 and C2 is identical, and the internal calibration matrix K is identical.

Here, the relative positional relationship of the camera at the camera centers C1 and C2 is represented by the rotational transformation matrix R and the three-dimensional translation vector T. The camera characteristic is represented by the internal calibration matrix K. There are geometrical limitations on the rotational transformation matrix R, the three-dimensional translation vector T, the internal calibration matrix K, and the points x1 and x2. Consequently, use of the inner parameter matrices $P_1$ and $P_2$ of the camera described above can derive a condition that projects the three-dimensional coordinate point X onto the points x1 and x2 in the images. The condition is required to satisfy the following equation, which is Expression (3)

$$x_2^T F x_1 = 0 \qquad \text{Expression (3)}$$

$$F = K^{-T} S_1 R K^{-1} \qquad \text{Expression (4)}$$

Expression (3) is an expression of an epipolar limitation. The matrix F in the epipolar limitation is called a fundamental matrix. The fundamental matrix F is an expression that represents the rotation and translation amounts between the two camera centers C1 and C2. Expression (3) is an expression of transforming the point x1 to the point x2. Expression (4) is an expression that represents the fundamental matrix F by the rotational transformation matrix R, three-dimensional translation vector T, internal calibration matrix K, and alternating matrix St. The alternating matrix St in Expression (4) is the alternating matrix represented by the three-dimensional translation vector T.

Consequently, Expression (3) is solved using the information on the group of the corresponding points between the two frames obtained in S501 to obtain the fundamental matrix F. The method of obtaining the fundamental matrix F may be, for example, the eight-point method that uses eight corresponding points, and the least squares method that uses SVD (singular value decomposition). Any of the methods may be used. After the fundamental matrix F is obtained, the inner parameter matrix of the camera is restored using Expression (4), thereby allowing the rotational transformation matrix R and the translation vector T between the two frames to be obtained. In FIG. 5A described above, the variations of the translation vector T among the calculated variations are arranged in a time series manner (sequence of frame numbers). After S502, the processing of the camera trajectory estimating unit 103 advances to the process in S503 to be performed by the variation accumulating unit 1033.

In S503, the variation accumulating unit 1033 accumulates the variation calculated in S502 in the temporal direction to estimate the camera trajectory. As described above, the image variation ax for each frame in FIG. 5A is accumulated in the temporal direction to thereby estimate the input camera trajectory v as illustrated in FIG. 5B. Here, accumulation of the variation of the translation vector T in the temporal direction can estimate the variation in position of camera trajectory. Accumulation of the variation of the rotational transformation matrix R in the temporal direction can estimate the variation in the camera direction in the camera trajectory. The camera direction represents the optical axis direction of the camera. After the variation accumulating process in S503 is completed, the camera trajectory estimating unit 103 finishes the processing of the flowchart of FIG. 7.

Figure 9:
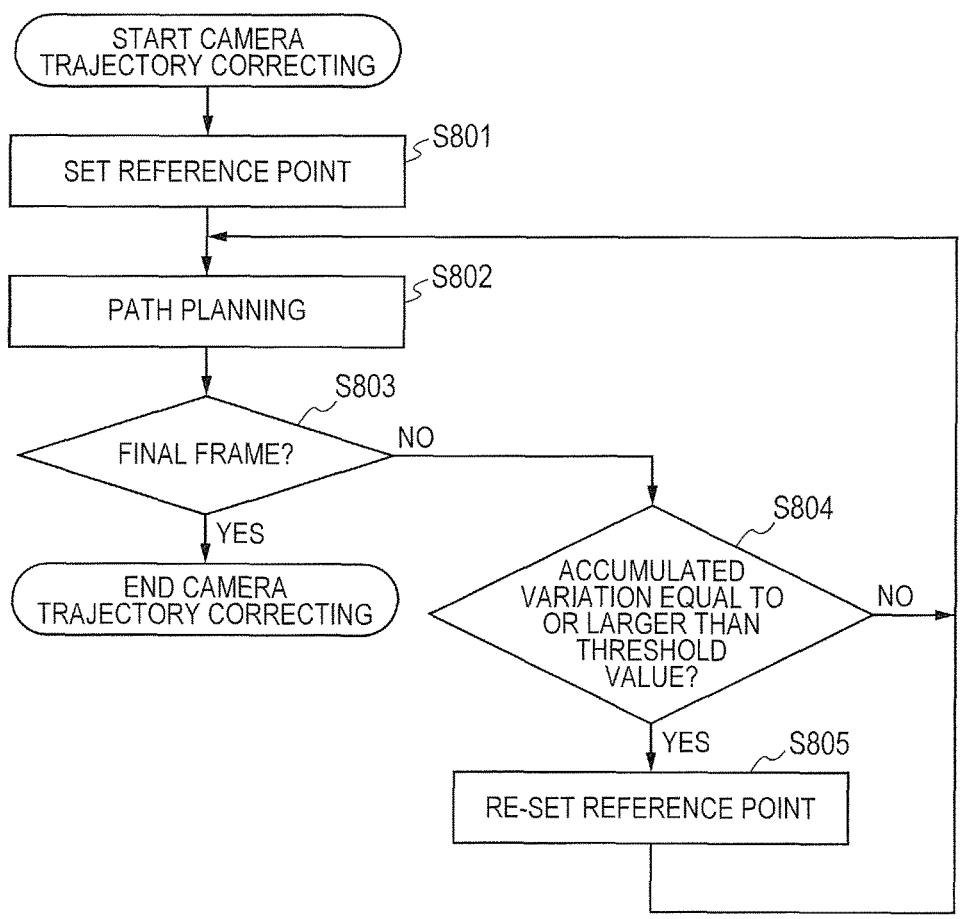
FIG. 9 is a flowchart illustrating an operation of the camera trajectory correcting unit of a first embodiment.

FIG. 9 is a flowchart that represents the flow of the detailed processing of the camera trajectory correcting process in S403 of FIG. 4 by the camera trajectory correcting unit 104 in FIG. 3.

In S801 in FIG. 9, the reference point setting unit 1041 of the camera trajectory correcting unit 104 sets the reference point in the first frame image (frame number 0) in the taken moving image. The reference point may be set based on image information, such as what is called a vanishing point or an image characteristic point, for example. Alternatively, the reference point may be set according to any point designated by the user on a display image on a display screen, for example. The vanishing point is an infinity point at which a group of parallel straight lines finally intersect with each other by extending in a depth direction in a scenography or perspective drawing, for example. That is, the reference point may be set by any method only if the method can set the reference point so that the subject and the vanishing point are not eliminated in the output image of the stabilized moving image. FIG. 6A described above illustrates an example where a reference point 901 is set in the input frame image 920. The reference point setting in this embodiment encompasses not only a case of being set by the user but also a case of being calculated based on the image signal of the taken moving image and estimated and automatically set. After S801, the process by the camera trajectory correcting unit 104 advances to the process in S802 to be performed by the path planning unit 1042.

In S802, the path planning unit 1042 corrects the variation of the camera trajectory estimated in S402 based on the reference point set in S801. The path planning process performed by the path planning unit 1042 can be represented by the following Expressions (5) to (10).

$$E_{length} = \int \|p(t)'\|^2 dt \qquad \text{Expression (5)}$$

$$E_{smooth} = \int \|p(t)''\|^2 dt + \int \|f(t)''\|^2 dt \qquad \text{Expression (6)}$$

$$E_{approx} = \sum \min_t \|p_{in} - p(t)\|^2 \qquad \text{Expression (7)}$$

$$E_{point} = \int \min_t \|c - pt(t)\|^2 dt \qquad \text{Expression (8)}$$

$$E_{point} = \int \min_t \|pc(t) - p(t)\|^2 dt \qquad \text{Expression (9)}$$

$$E = \lambda_1 E_{length} + \lambda_2 E_{smooth} + \lambda_3 E_{approx} + \lambda_4 E_{point} \qquad \text{Expression (10)}$$

In these Expressions (5) to (10), p(t) represents the camera position after correction of the camera trajectory at time t, and f(t) represents the camera direction after correction of the camera trajectory at time t. Furthermore, among the camera positions during moving image taking (hereinafter called input camera positions), $p_{in}$ is the input camera position at a position nearest to the camera position p(t) after correction at time t, and c is the camera central point represented by coordinates (0, 0) in the image corresponding to the corrected camera trajectory (hereinafter called an output image). pt(t) is the reference point (position) in the output image at time t, and pc(t) is the camera position in a case where the reference point pt(t) at time t coincides with the camera central point c.

Figure 10A:
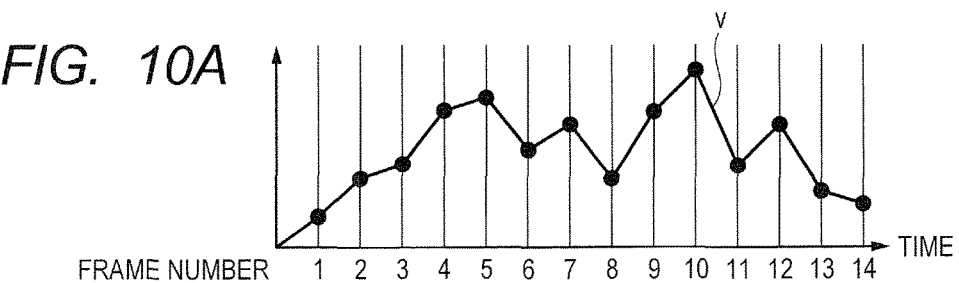
FIGS. 10A, 10B, 10C and 10D are diagrams illustrating imaging trajectories and correction of variations in imaging trajectories.
Figure 10B:
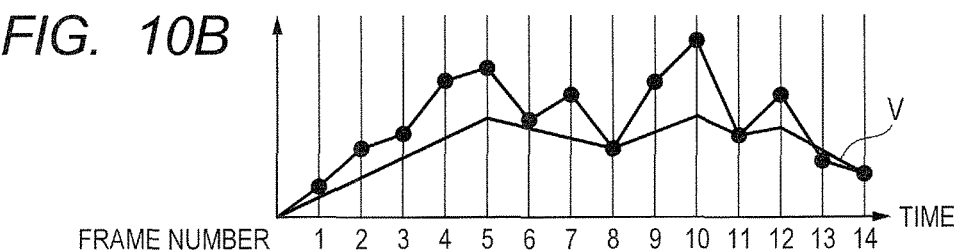
Figure 10C:
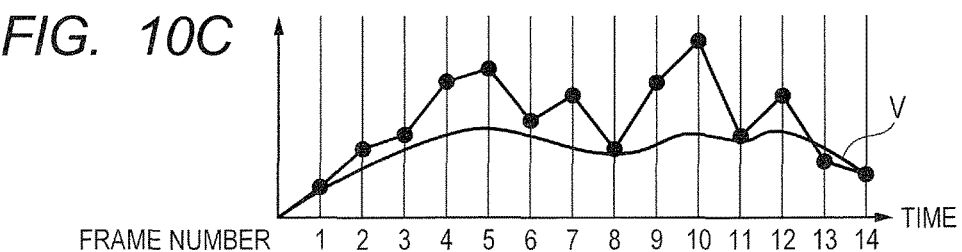
Figure 10D:
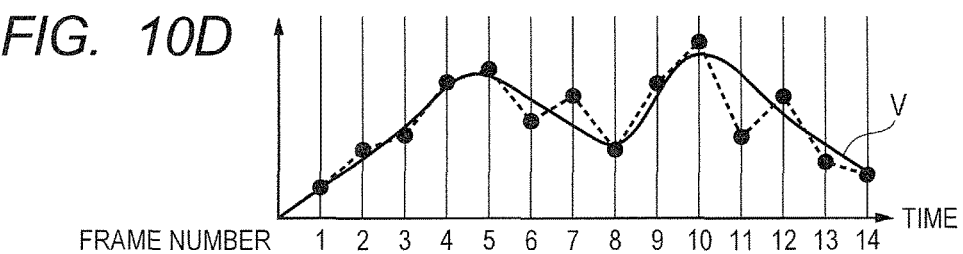

Here, Expression (5) is an expression for adjusting the length of the corrected camera trajectory. For example, in a case where the camera trajectory during moving image taking is the input camera trajectory v represented in FIG. 10A equivalent to FIG. 5B, adjustment of the length of the corrected camera trajectory by Expression (5) generates the corrected camera trajectory V whose length has been adjusted as in FIG. 10B. p(t)' in Expression (5) is the camera position in a case where the length of the camera trajectory is adjusted. FIG. 10B is a diagram illustrating an example of the corrected camera trajectory V after the input camera trajectory v during moving image taking is adjusted to have a smaller length by Expression (5). Expression (6) is an expression for adjusting the variation in camera position and attitude in the corrected camera trajectory V on a frame-by-frame basis so as to be smoothed. FIG. 10C is a diagram illustrating an example where the variation of the corrected camera trajectory V on a frame-by-frame basis is adjusted to be smoothed by Expression (6). p(t)'' and f(t)'' in Expression (6) are the camera position and the camera direction in a case where the variation is adjusted to be smoothed. Expression (7) is an expression for adjusting the difference between the input camera position in the input camera trajectory v and the corrected camera position in the corrected camera trajectory V. FIG. 10D is a diagram illustrating an example where the corrected camera trajectory V is adjusted to have a smaller difference from the input camera trajectory by Expression (7). Furthermore, Expression (8) is an expression for adjusting the difference between the reference point and the central point in the output image. Expression (9) is an expression representing the camera position where Expression (8) has been transformed. Expression (10) is an expression of path planning represented by Expressions (5) to (7) and (9).

Hereinafter, Expression (8) is described with reference to FIGS. 6A to 6C.

As described above, it is assumed that in S801 the reference point 901 (reference point pt(t)) is set to the input frame image 920 as in FIG. 6A by the reference point setting unit 1041. Here, FIG. 6B illustrates an example of a modified frame image 921 obtained by modifying the input frame image 920 in FIG. 6A in conformity with the corrected camera position p(t). In the modified frame image 921 in FIG. 6B, an output image 903 is assumed as an image in an angle-of-field region cut out based on the corrected camera position p(t). FIG. 6B illustrates a state where the central point 902 (central point c) and the reference point 901 (reference point pt(t)) in the output image 903 have a positional difference.

The path planning unit 1042 generates the output image 904 having a reduced difference between the central point 902 (central point c) and the reference point 901 (reference point pt(t)) as in FIG. 6C by Expression (8). In this embodiment, the corrected camera position with the difference of 0 (zero) is assumed as the camera position pc(t) described above. In actuality, the output image 903 in FIG. 6C and the output image 904 in FIG. 6D are images output by the process in S404. The path planning unit 1042 transforms Expression (8) into Expression (9) to adopt the transformed expression as the expression of the camera position.

Hereinafter, Expression (9) is described with reference to FIG. 6D.

In FIG. 6D, the reference point 901 is the reference point pt(t), the central point 902 is the central point c, the output image 903 is the image in the angle-of-field region cut out based on the corrected camera position p(t), and the output image 904 is the image in the angle-of-field region cut out based on the corrected camera position pc(t). A corrected camera position 905 is the corrected camera position p(t), a corrected camera position 906 is the corrected camera position pc(t), and an input camera position 907 is the input camera position $p_{in}$. A position 908 is the position of the reference point 901 (reference point pt(t)) in a space, and the position 909 is the position of the central point 902 (central point c) of the output image 903 in the space. The output image 904 is the image in the angle-of-field region cut out based on the corrected camera position 903 (corrected camera position pc(t)), and is the image in a case where the reference point p(t) coincides with the camera central point c. Expression (9) serves as a term that causes the corrected camera position 905 (corrected camera position p(t)) to approach the corrected camera position 906 (corrected camera position pc(t)).

The path planning unit 1042 accumulates the corrected camera position p(t) and the corrected camera direction f(t) that minimize Expression (10) represented by Expressions (5) to (7) and (9) described above in a time series manner (sequence of frame numbers). Consequently, as illustrated in 5C, the corrected camera trajectory V is generated. In this embodiment, the description has been made where the central point c described above is adopted as the point caused to approach the reference point p(t). The point caused to approach the reference point pt(t) is not necessarily the central point c. Alternatively, this point may be freely set. Expression (10) is an expression that changes the weight of each term by λ in the expression. For example, when the value of $\lambda_2$ is set to be large and the value of the $\lambda_3$ is set to be small, priority is given to smoothing of the variation on a frame-by-frame basis although the corrected camera trajectory V becomes a camera trajectory apart from the input camera trajectory v in FIG. 10A, as illustrated in FIG. 10C. After S802, the path planning unit 1042 advances the processing to S803.

In S803, the path planning unit 1042 determines whether the frame being processed is the final frame or not. When this unit determines that the frame is the final frame (Yes), the processing of the flowchart of FIG. 9 is finished. On the contrary, when the path planning unit 1042 determines that the frame is not the final frame (No) in S803, this unit advances the processing to S804.

In S804, the path planning unit 1042 sets the reference point in S801 or S805 and then determines whether or not the accumulated variation obtained in S402 is equal to or larger than the predetermined threshold. When the path planning unit 1042 determines that the accumulated variation is not equal to or larger than the threshold (less than the threshold) in S804 (No), this unit returns the processing to S802 and performs the process for the next frame. On the contrary, when it is determined that the accumulated variation is equal to or larger than the threshold in S804 (Yes), the process by the camera trajectory correcting unit 104 advances to the process in S805 to be performed by reference point setting unit 1041 in FIG. 3.

In S805, the reference point setting unit 1041 re-sets the reference point in the current frame. After S5805, the process by the camera trajectory correcting unit 104 returns the process to S802 to be performed by the path planning unit 1042. Consequently, the path planning unit 1042 performs the process of the transition to S802 described above, using the reference point re-set in S5805.

The process as described above allows the image processing apparatus 100 in the first embodiment to generate the stabilized moving image where the image region around the reference point is accommodated in the frame image. In this embodiment, the reference point is set based on one of the vanishing point, any point designated by the user, and the image characteristic point. Consequently, this embodiment is resistant to coming into a state where a frame image only with the air and ground visible for example but without any subject visible is generated, when the stabilized moving image (including the N-time speed stabilized moving image) with a reduced variation in imaging trajectory is generated.

Second Embodiment

Hereinafter, an image processing apparatus 100 of a second embodiment is described. Description of the same configuration and processes of the image processing apparatus 100 in the second embodiment as those in the first embodiment described above is omitted.

Figure 11:
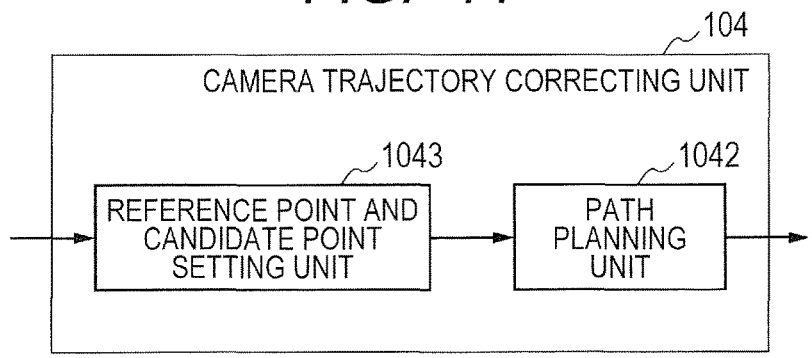
FIG. 11 is a diagram illustrating a schematic configuration of a camera trajectory correcting unit of a second embodiment.
Figure 12:
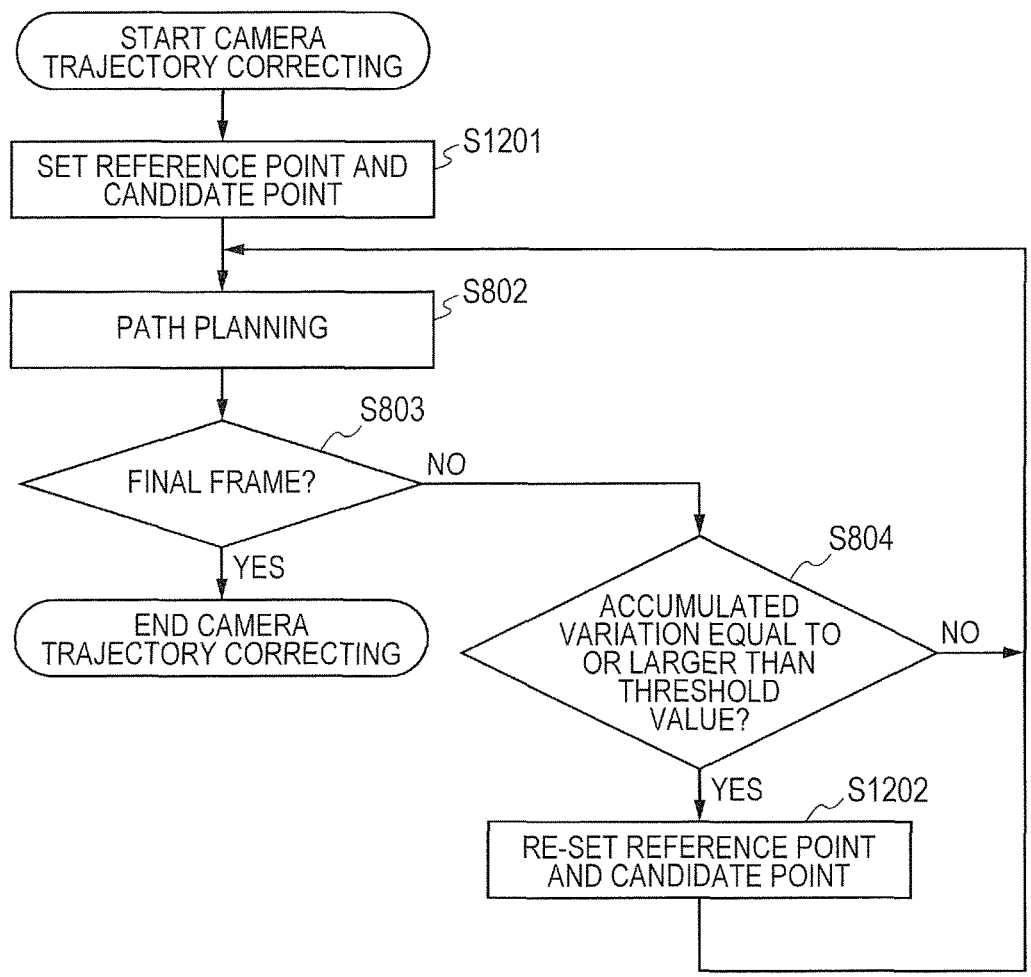
FIG. 12 is a flowchart illustrating an operation of the camera trajectory correcting unit of the second embodiment.

FIG. 11 is a diagram illustrating a schematic configuration of the camera trajectory correcting unit 104 of the image processing apparatus 100 in the second embodiment. In FIG. 11, the same configuration elements as those in FIG. 3 described above are assigned the same reference signs. The description of these elements is omitted. In the case of the second embodiment, the camera trajectory correcting unit 104 includes a reference point and candidate point setting unit 1043 instead of the reference point setting unit 1041 in FIG. 3. FIG. 12 is a flowchart that represents the flow of the camera trajectory correcting process performed in S403 of FIG. 4 by the camera trajectory correcting unit 104 in the second embodiment. In FIG. 12, the same processing steps as those in FIG. 9 described above are assigned the same reference signs. The description of these elements is omitted. In the case of the second embodiment, the camera trajectory correcting unit 104 performs the process in S1201 instead of the process in S801 in FIG. 9, and performs the process in S1202 instead of S805 in FIG. 9.

Figure 13A:
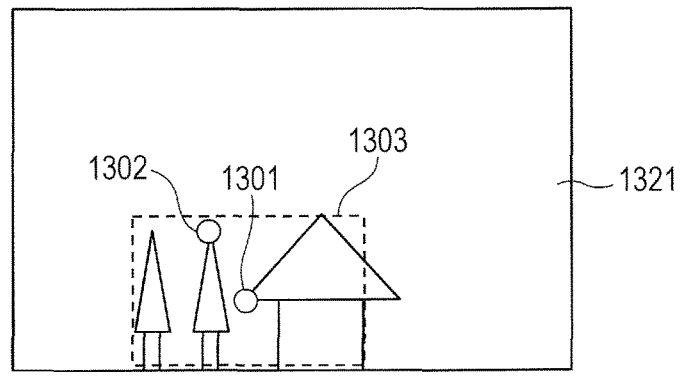
FIGS. 13A, 13B and 13C are diagrams illustrating a reference point and a candidate reference point during camera trajectory correcting.

The reference point and candidate point setting unit 1043 in FIG. 11 sets the reference point and the candidate reference point on the first frame image (frame number 0) in the taken moving image in S1201 in FIG. 12. The reference point and the candidate reference point are set as with the reference point described in the first embodiment described above. At least one point is set for each of these points. FIG. 13A is a diagram illustrating an example of an input frame image 1321 having the frame number 0. The reference point and candidate point setting unit 1043 sets a reference point 1301 and a candidate reference point 1302, for example, on the input frame image 1321 having the frame number 0 as illustrated in FIG. 13A. After S1201, the process of the camera trajectory correcting unit 104 advances to the processes in and after S802 described above.

When it is determined that the accumulated variation is equal to or larger than the threshold in S804 described above, the camera trajectory correcting unit 104 in the second embodiment advances the processing to the process in S1202 to be performed by the reference point and candidate point setting unit 1043. A range 1303 encircled by broken lines in FIG. 13A indicates a range where the accumulated variation is less than the threshold (hereinafter represented as the accumulated variation range 1303). In S1202, the reference point and candidate point setting unit 1043 re-sets the reference point and the candidate reference point in the current frame, and subsequently returns the processing to S802. At this time, the reference point and candidate point setting unit 1043 selects the reference point to be re-set from among the candidate reference points set in S1201 before re-setting.

Figure 13B:
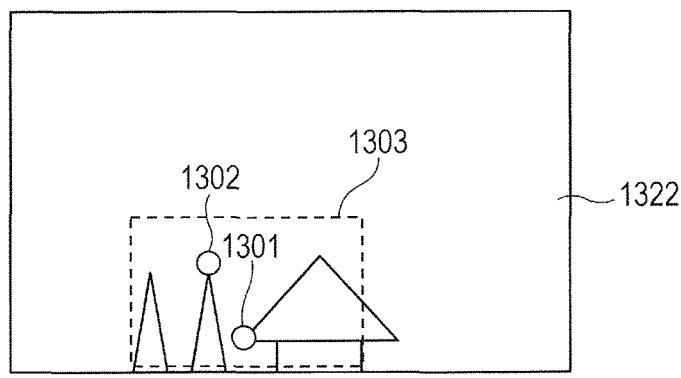
Figure 13C:
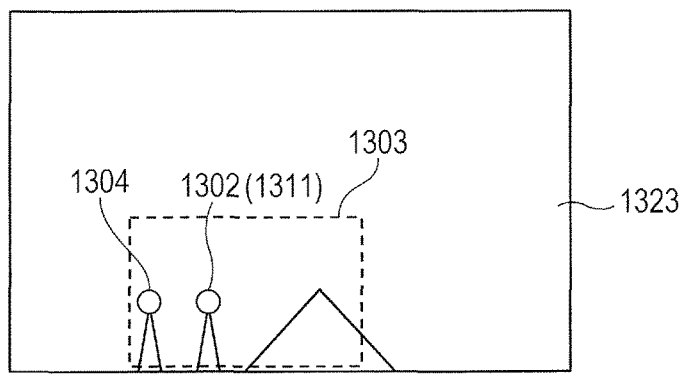

FIG. 13B illustrates an example of an input frame image 1322 in a case where the accumulated variation is not equal to or larger than the threshold (less than the threshold), and represents an example where the reference point 1301 set in FIG. 13A is within the accumulated variation range 1303. In this case, the reference point and candidate point setting unit 1043 does not re-set the reference point. On the other hand, FIG. 13C illustrates an example of an input frame image 1323 in a case where the accumulated variation is equal to or larger than the threshold, and represents an example where the reference point 1301 set in FIG. 13A is out of the accumulated variation range 1303. In this case, for example, the reference point and candidate point setting unit 1043 re-sets the candidate reference point 1302 as a reference point 1311, and further re-sets a new candidate reference point 1304.

As described above, when the accumulated variation is equal to or larger than the predetermined threshold, the image processing apparatus 100 in the second embodiment re-sets the reference point and the candidate reference point. The reference point to be re-set is selected from among candidate reference points having not been re-set yet. Consequently, the reference point is smoothly switched. According to the second embodiment, even when the variation in camera trajectory is a large variation having at least a certain value, a stabilized moving image where the image region around the re-set reference point is accommodated in the frame image can be generated. Consequently, the second embodiment can generate more stable stabilized moving image (including the N-time speed stabilized moving image) than that in the first embodiment. In this case, the second embodiment is resistant to coming into a state where a frame image without any subject being visible is generated.

Third Embodiment

Hereinafter, an image processing apparatus 100 of a third embodiment is described. Description of the same configuration and processes of the image processing apparatus 100 in the third embodiment as those in the first embodiment described above is omitted.

Figure 14:
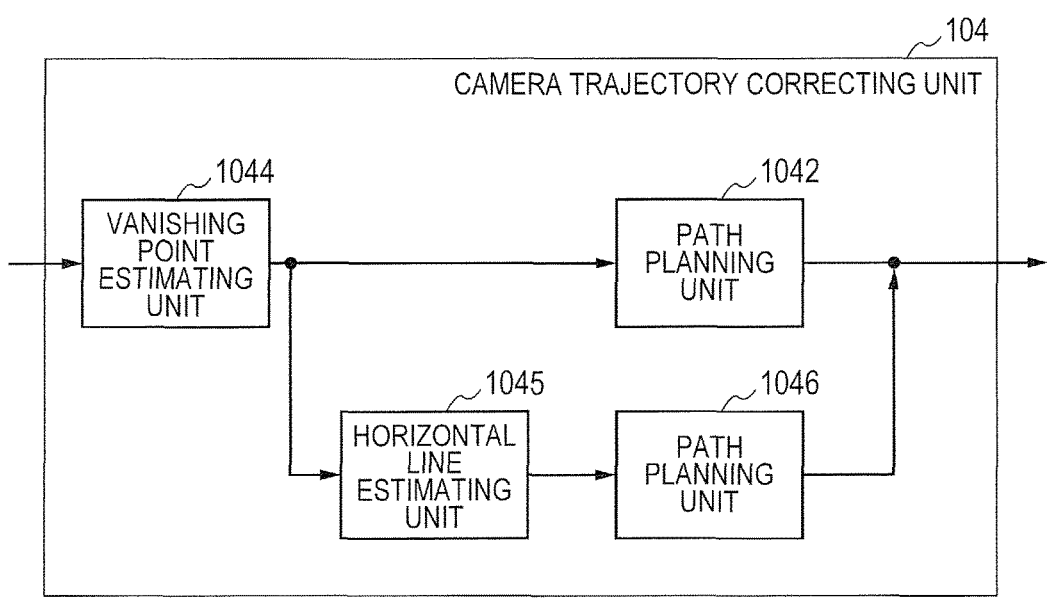
FIG. 14 is a diagram illustrating a schematic configuration of a camera trajectory correcting unit of a third embodiment.
Figure 15:
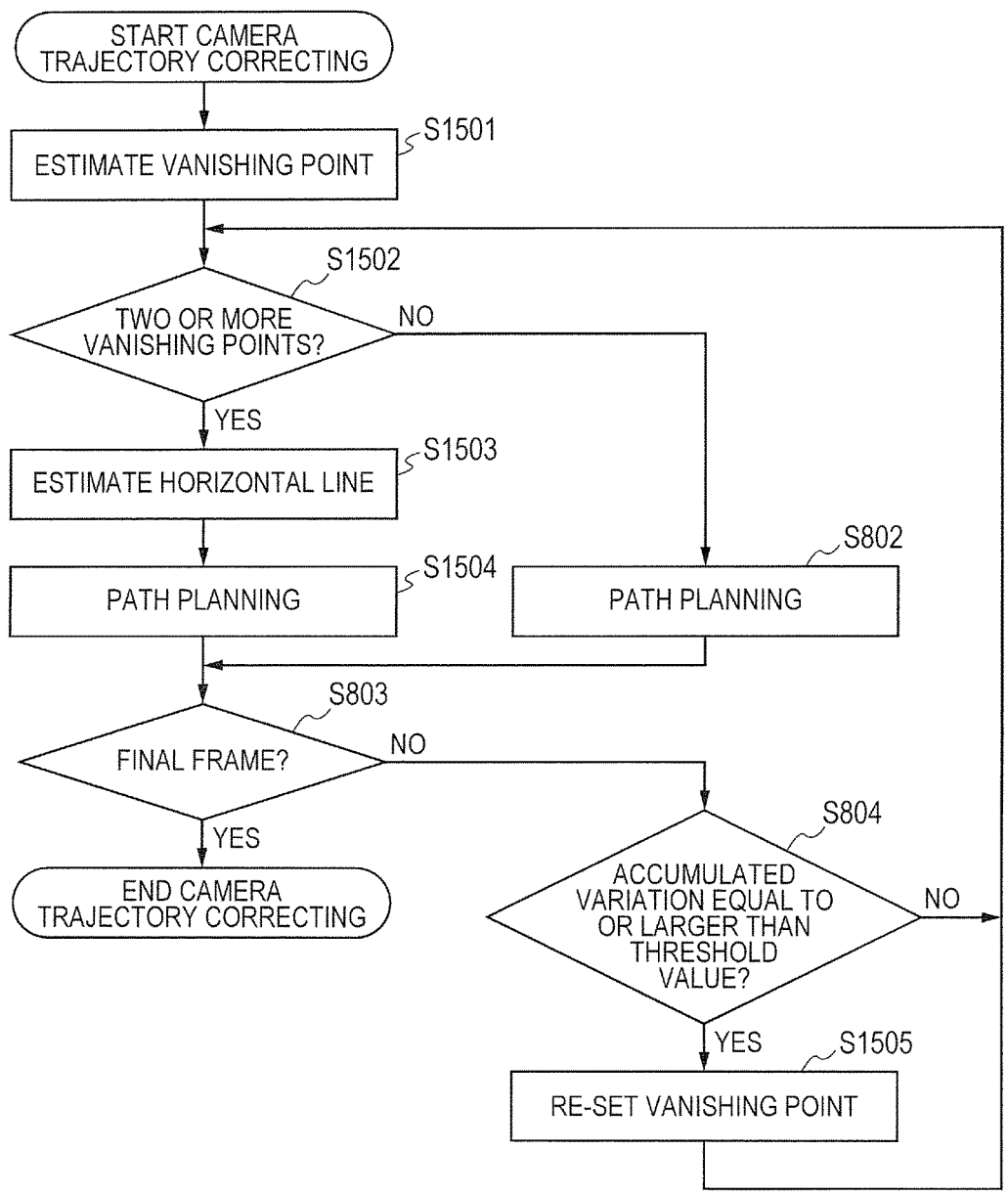
FIG. 15 is a flowchart illustrating an operation of the camera trajectory correcting unit of the third embodiment.

FIG. 14 is a diagram illustrating a schematic configuration of the camera trajectory correcting unit 104 of the image processing apparatus 100 in the third embodiment. In FIG. 14, the same configuration elements as those in FIG. 3 described above are assigned the same reference signs. The description of these elements is omitted. In the case of the third embodiment, the camera trajectory correcting unit 104 includes a vanishing point estimating unit 1044 and a horizontal line estimating unit 1045 instead of the reference point setting unit 1041 in FIG. 3. This unit 104 further includes a path planning unit 1046 in addition to the path planning unit 1042 described above. In the following description, the path planning unit 1042 is represented as a first path planning unit 1042, and the path planning unit 1046 is represented as a second path planning unit 1046. FIG. 15 is a flowchart that represents the flow of the camera trajectory correcting process performed in S403 of FIG. 4 by the camera trajectory correcting unit 104 in the third embodiment. In FIG. 15, the same processing steps as those in FIG. 9 described above are assigned the same reference signs. The description of these elements is omitted.

In S1501 in the flowchart of FIG. 15, the vanishing point estimating unit 1044 in FIG. 14 estimates the vanishing point on the first frame image (frame number 0). More specifically, for example, the vanishing point estimating unit 1044 estimates lines from an image according to Hough transform, adopts the intersections between the lines as candidate vanishing points, and estimates the vanishing point among the candidate vanishing points. After S1501, the vanishing point estimating unit 1044 advances the processing to S1502.

In S1502, the vanishing point estimating unit 1044 determines whether the number of the vanishing points estimated in S1501 is at least two or not. When it is determined that the number of estimated vanishing points is not at least two (one or less) in S1502 (No), the process by the camera trajectory correcting unit 104 advances to the process in S802 to be performed by the first path planning unit 1042. The process in S802 is a process equivalent to the process described in the aforementioned first embodiment. After S802, the first path planning unit 1042 advances the processing to S803. The process in S803 is a process equivalent to the process described in the aforementioned first embodiment. On the other hand, when it is determined that the number of the estimated vanishing points is at least two in S1502 (Yes), the process by the camera trajectory correcting unit 104 advances to the process in S1503 to be executed by the horizontal line estimating unit 1045.

Figure 16A:
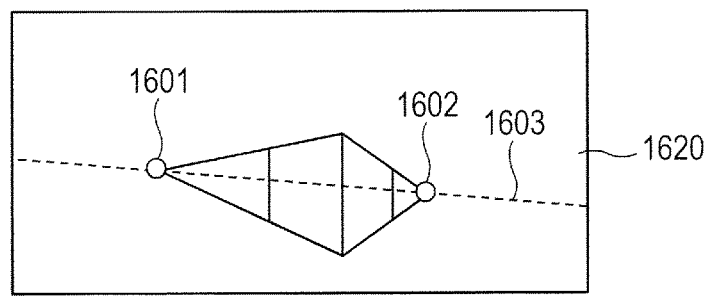
FIGS. 16A, 16B and 16C are diagrams illustrating a horizontal line and a central point during camera trajectory correcting.

In S1503, the horizontal line estimating unit 1045 estimates the horizontal line on the first frame image (frame number 0) using the two or more vanishing points estimated in S1501. More specifically, the horizontal line estimating unit 1045 adopts the line including the estimated two vanishing points as the horizontal line. FIG. 16A illustrates an example where a vanishing point 1601 and a vanishing point 1602 reside in an input frame image 1620. The horizontal line estimating unit 1045 adopts the line including the estimated two vanishing points 1601 and 1602 as the horizontal line 1603. After S1503, the process by the camera trajectory correcting unit 104 advances to the process in S1504 to be performed by the second path planning unit 1046.

In S1504, the second path planning unit 1046 corrects the variation in camera trajectory estimated in S402 of FIG. 4 described above using the horizontal line estimated in S1503. The path planning process performed by the second path planning unit 1046 can be represented by Expressions (5) to (7) described above and the following Expressions (11) to (13).

$$E_{horizon} = \int \min_t \left\| h(c) - \lim_{a \to 0} hl(t) \right\|^2 dt \quad \text{Expression (11)}$$

$$E_{horizon} = \int \min_t \|pc(t) - p(t)\|^2 dt + \int \min_t \|fc(t) - f(t)\|^2 dt \quad \text{Expression (12)}$$

$$E = \lambda_1 E_{length} + \lambda_2 E_{smooth} + \lambda_3 E_{approx} + \lambda_5 E_{horizon} \quad \text{Expression (13)}$$

Figure 16B:
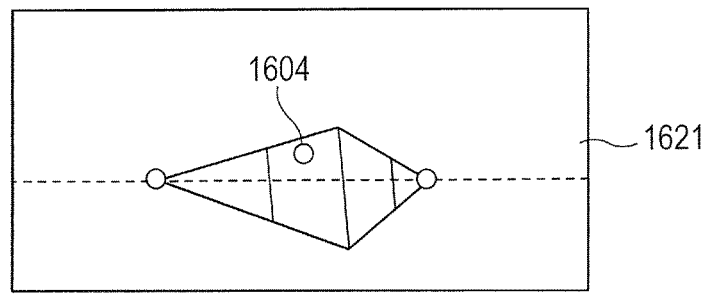
Figure 16C:
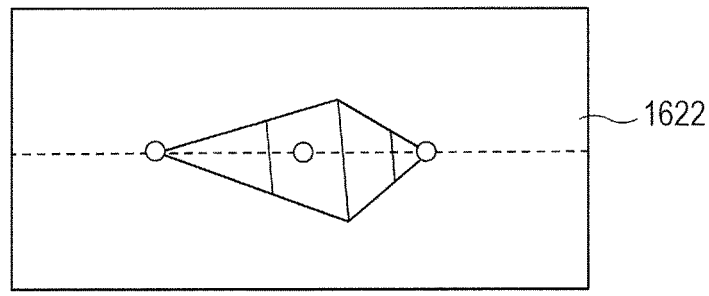

In Expressions (11) to (13), hl(t) represents an expression of an estimated horizontal line in the output image at time t, h(c) represents an expression of a line that passes through the central point c and has a slope of 0, and a represents the slope of the horizontal line. FIGS. 16B and 16C represent Expression (7). FIG. 16B represents an image 1621 where the slope of the horizontal line 1603 (horizontal line hl(t)) is corrected to zero. FIG. 16C illustrates an example of an image 1622 where the horizontal line 1603 is caused to approach the line h(c) that passes through the central point 1604 (central point c) and has a slope of 0.

Expression (12) transformed from Expression (11) is adopted as the expression of the camera position and attitude. A value in Expression (12) is adopted as $E_{horizon}$ in Expression (13). fc(t) is the camera attitude where horizontal line hl(t) coincides with the line h(c) at time t. The second path planning unit 1046 accumulates the corrected camera position p(t) minimizing Expression (13) and the corrected camera direction f(t) in a time series manner (sequence of frame numbers), thereby generating the corrected camera trajectory V as illustrated in FIG. 5C described above. In the third embodiment, description has been made where the line passing through the central point c in the output image is exemplified as the line which the horizontal line hl(t) is caused to approach. The point passing through the line which the horizontal line hl(t) is caused to approach is not necessarily the central point. This point may be freely set. After S1504, the process by the second path planning unit 1046 advances to the processing to S803.

In the case of the third embodiment, when the processing advances from S802 to S803, the process in S803 is performed by the first path planning unit 1042. When the processing advances from S1504 to S803, this process is performed by the second path planning unit 1046. When it is determined that the frame is not the final frame in S803 and the processing advances to the process in S804 and when it is further determined that the accumulated variation is equal to or larger than the threshold in S804, the process by the camera trajectory correcting unit 104 advances to the process in S1505 to be performed by the vanishing point estimating unit 1044.

In S1505, the vanishing point estimating unit 1044 re-estimates the vanishing point on the current frame image, and subsequently returns the processing to the process in S1502. At this time, the vanishing point estimating unit 1044 performs the process in S1502 for the next frame image.

As described above, as with the first embodiment, the third embodiment causes the reference point of the image to approach any point in the output image. Furthermore, the third embodiment corrects the slope of the horizontal line. Thus, the traveling direction of the camera and the attitude of the camera in the imaging trajectory are allowed to coincide. Consequently, the third embodiment can generate a more stable moving image than the first embodiment described above.

The third embodiment may be combined with the second embodiment described above. For example, as with the example of the reference point and the candidate reference point in the second embodiment, the third embodiment estimates the vanishing point and candidate vanishing points in S1501, and further estimates the horizontal line and candidate horizontal lines in S1503. When it is determined that the accumulated variation is equal to or larger than the threshold in S804 and the processing proceeds to S1505, the vanishing point and candidate vanishing point are re-estimated for the current frame image. The vanishing point to be re-estimated is selected from the candidate vanishing points estimated before re-estimation. Thus, in the third embodiment, the vanishing point to be re-estimated is selected from among the candidate vanishing points before re-estimation. Consequently, the vanishing point is smoothly switched. The third embodiment can therefore generate the stable stabilized moving image (including the N-time speed stabilized moving image) without losing the subject taken in the taken moving image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

All the embodiments described above only exemplify specific implementations of the present invention. The technical scope of the present invention should not be construed in a limited manner owing to these embodiments. That is, the present invention can be implemented in various forms without departing from the technical thought or the principal characteristics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-111841, filed Jun. 3, 2016, which is hereby incorporated by reference herein in its entirety.

What is claimed is:

1. An image processing apparatus, comprising:
at least one processor or circuit configured to function as:
a trajectory estimation unit that estimates an imaging trajectory during taking of a first moving image, from the first moving image;
a trajectory correcting unit that corrects a trajectory variation in the estimated imaging trajectory;
a generating unit that generates a second moving image corresponding to the corrected imaging trajectory, from the first moving image; and
a setting unit that sets at least one reference point from the first moving image,
wherein the trajectory correcting unit corrects the imaging trajectory so as to cause the reference point in frame images constituting the second moving image to have a position residing within a predetermined range in the frame image, and
wherein the generating unit generates the second moving image spanning a shorter time than that of the first moving image.

2. The image processing apparatus according to claim 1, wherein the setting unit at least sets the vanishing point as the reference point.

3. The image processing apparatus according to claim 1, wherein when the reference point is out of the predetermined range, the setting unit re-sets the reference point from the first moving image.

4. The image processing apparatus according to claim 1, wherein the setting unit sets the reference point and candidate reference point, and
re-sets the candidate reference point as the reference point, when variation in the imaging trajectory is equal to or larger than a predetermined threshold.

5. The image processing apparatus according to claim 1, wherein the trajectory correcting unit corrects the imaging trajectory so as to have a small length.

6. The image processing apparatus according to claim 1, wherein the trajectory correcting unit corrects the imaging trajectory so as to correct a variation in camera position and attitude during the first moving image being taken.

7. The image processing apparatus according to claim 1, wherein the trajectory correcting unit corrects the imaging trajectory so as to make a difference between the imaging trajectory and the corrected imaging trajectory small.

8. An image processing apparatus, comprising:
at least one processor or circuit configured to function as:
a trajectory estimation unit that estimates an imaging trajectory during taking of a first moving image, from the first moving image;
a trajectory correcting unit that corrects a trajectory variation in the estimated imaging trajectory;
a generating unit that generates a second moving image corresponding to the corrected imaging trajectory, from the first moving image; and
a line estimating unit that estimates a horizontal line from the first moving image,
wherein the trajectory correcting unit corrects the imaging trajectory so as to cause the horizontal line in frame images constituting the second moving image to have a position residing within a predetermined range in the frame image, and
wherein the generating unit generates the second moving image spanning a shorter time than that of the first moving image.

9. The image processing apparatus according to claim 8, wherein the trajectory correcting unit further corrects the imaging trajectory so as to maintain the horizontal line in frame images constituting the second moving image to be horizontal.

10. The image processing apparatus according to claim 8, wherein the line estimating unit estimates two vanishing points from the first moving image, and estimates a line segment including the two vanishing points as the horizontal line.

11. The image processing apparatus according to claim 8, wherein the trajectory correcting unit corrects the imaging trajectory so as to have a small length.

12. The image processing apparatus according to claim 8, wherein the trajectory correcting unit corrects the imaging trajectory so as to correct a variation in camera position and attitude during the first moving image being taken.

13. The image processing apparatus according to claim 8, wherein the trajectory correcting unit corrects the imaging trajectory so as to make a difference between the imaging trajectory and the corrected imaging trajectory small.

14. An image processing method in an image processing apparatus, the method comprising:
estimating an imaging trajectory during taking of a first moving image, from the first moving image;
setting at least one reference point from the first moving image,
correcting a trajectory variation in the estimated imaging trajectory; and
generating a second moving image corresponding to the corrected imaging trajectory, from the first moving image,
wherein the correcting corrects the imaging trajectory so as to cause the reference point in frame images constituting the second moving image to have a position residing within a predetermined range in the frame image, and
wherein the second moving image is generated to span a shorter time than that of the first moving image.

15. An image processing method in an image processing apparatus, the method comprising:
estimating an imaging trajectory during taking of a first moving image, from the first moving image;
estimating a horizontal line from the first moving image;
correcting a trajectory variation in the estimated imaging trajectory; and
generating a second moving image corresponding to the corrected imaging trajectory, from the first moving image,
wherein the correcting corrects the imaging trajectory so as to cause the horizontal line in frame images constituting the second moving image to have a position residing within a predetermined range in the frame image, and
wherein the second moving image is generated to span a shorter time than that of the first moving image.

16. A non-transitory computer-readable recording medium storing a readable program for operating a computer to operate as an image processing apparatus performing:
estimating an imaging trajectory during taking of a first moving image, from the first moving image;
correcting a trajectory variation in the estimated imaging trajectory;
generating a second moving image corresponding to the corrected imaging trajectory, from the first moving image; and
setting at least one reference point from the first moving image,
wherein the imaging trajectory is corrected so as to cause the reference point in frame images constituting the second moving image to have a position residing within a predetermined range in the frame image, and
wherein the second moving image is generated to span a shorter time than that of the first moving image.

* * * * *